US007247076B2

(12) United States Patent
Dang et al.

(10) Patent No.: US 7,247,076 B2
(45) Date of Patent: Jul. 24, 2007

(54) PULSE WIDTH MODULATION DRIVE AND METHOD FOR ORNAMENTS WITH MOVABLE COMPONENTS

(75) Inventors: Phu Dang, Shawnee, KS (US); Tim Lien, Shawnee, KS (US)

(73) Assignee: Hallmark Cards, Incorporated, Kansas City, MO (US)

( * ) Notice: Subject to any disclaimer, the term of this patent is extended or adjusted under 35 U.S.C. 154(b) by 0 days.

(21) Appl. No.: 11/251,606

(22) Filed: Oct. 14, 2005

(65) Prior Publication Data

US 2007/0086755 A1 Apr. 19, 2007

(51) Int. Cl.
*A63H 33/26* (2006.01)
(52) U.S. Cl. .................... 446/102; 446/175; 446/219; 318/599; 40/411; 40/414
(58) Field of Classification Search ............... 318/804, 318/599; 446/102, 175, 219; 40/411, 414
See application file for complete search history.

(56) References Cited

U.S. PATENT DOCUMENTS

| 4,980,608 A | | 12/1990 | Morrison ................ 315/185 S |
|---|---|---|---|
| 4,989,120 A | | 1/1991 | Davis et al. .................. 362/35 |
| 5,089,761 A | | 2/1992 | Nakazawa .................. 318/711 |
| 5,102,366 A | * | 4/1992 | Huang et al. ................. 40/418 |
| 5,118,302 A | | 6/1992 | Fussell et al. ............... 439/225 |
| 5,190,285 A | * | 3/1993 | Levy et al. .................... 463/36 |
| 5,255,461 A | * | 10/1993 | Chiou .......................... 40/415 |
| 5,280,682 A | | 1/1994 | Fussell ........................ 40/409 |
| 5,402,702 A | * | 4/1995 | Hata ........................ 84/464 R |
| 5,518,784 A | | 5/1996 | Fussell .......................... 428/7 |
| 5,550,319 A | | 8/1996 | Segan et al. .................. 84/103 |
| 5,618,103 A | | 4/1997 | Fussell ........................ 362/386 |
| 5,683,762 A | | 11/1997 | Banschick ...................... 428/4 |
| 5,700,177 A | * | 12/1997 | Lemelson ................... 446/117 |
| 5,797,785 A | * | 8/1998 | Silberstein .................. 446/227 |
| 5,847,530 A | | 12/1998 | Hill ............................ 318/599 |
| 5,870,842 A | * | 2/1999 | Ogden et al. .................. 40/41 |
| 5,870,844 A | * | 2/1999 | Lin ............................. 40/411 |
| 5,906,369 A | * | 5/1999 | Brennan et al. ............. 273/238 |
| 5,915,853 A | * | 6/1999 | Guilin ......................... 40/414 |
| 5,924,784 A | | 7/1999 | Chliwnyj et al. ........... 362/234 |
| 6,001,433 A | * | 12/1999 | Meng ........................... 428/13 |
| 6,037,679 A | | 3/2000 | Pirillo ........................ 307/125 |
| 6,166,496 A | | 12/2000 | Lys et al. .................... 315/316 |
| 6,211,626 B1 | | 4/2001 | Lys et al. .................... 315/291 |
| 6,241,362 B1 | | 6/2001 | Morrison .................... 362/231 |
| 6,292,901 B1 | | 9/2001 | Lys et al. .................... 713/300 |

(Continued)

OTHER PUBLICATIONS

Barr, "Introduction to Pulse Width Modulation", *Embedded Systems Programming*, 2001, pp. 103-104.

(Continued)

*Primary Examiner*—Rita Leykin
(74) *Attorney, Agent, or Firm*—Fish & Richardson P.C.

(57) ABSTRACT

A decoration device may include a low-friction drive line and a PWM controlled motor that reduces or eliminates the gearing needed to achieve appropriate speed and torque at the motor output shaft. In preferred embodiments, the decoration device is an ornament that includes a low friction interfaces to accommodate relatively low torque output from the PWM drive motor. In certain embodiments, the PWM controller drives a motor at low speeds suitable for ornament applications.

29 Claims, 10 Drawing Sheets

U.S. PATENT DOCUMENTS

| | | | | |
|---|---|---|---|---|
| 6,340,868 B1 | 1/2002 | Lys et al. | | 315/185 S |
| 6,459,919 B1 | 10/2002 | Lys et al. | | 600/407 |
| 6,491,516 B1 * | 12/2002 | Tal et al. | | 431/253 |
| 6,497,607 B1 * | 12/2002 | Hampton et al. | | 446/301 |
| 6,528,954 B1 | 3/2003 | Lys et al. | | 315/291 |
| 6,577,080 B2 | 6/2003 | Lys et al. | | 315/362 |
| 6,608,459 B2 | 8/2003 | Kasagami et al. | | 318/560 |
| 6,720,745 B2 | 4/2004 | Lys et al. | | 315/312 |
| 6,765,356 B1 | 7/2004 | Denen et al. | | 318/6 |
| 6,783,425 B2 | 8/2004 | McKeefery | | 446/455 |
| 6,835,131 B1 * | 12/2004 | White et al. | | 463/1 |
| 2001/0033488 A1 | 10/2001 | Chliwnyj et al. | | 362/231 |
| 2002/0047646 A1 | 4/2002 | Lys et al. | | 315/312 |
| 2002/0095226 A1 | 7/2002 | Suzuki et al. | | 700/56 |
| 2002/0113555 A1 | 8/2002 | Lys et al. | | 315/149 |
| 2003/0006669 A1 * | 1/2003 | Pei et al. | | 310/309 |
| 2003/0011538 A1 | 1/2003 | Lys et al. | | 345/39 |
| 2003/0076281 A1 | 4/2003 | Morgan et al. | | 345/44 |
| 2003/0100837 A1 | 5/2003 | Lys et al. | | 600/476 |
| 2003/0190967 A1 * | 10/2003 | Henry | | 472/128 |
| 2004/0027032 A1 * | 2/2004 | Moteki et al. | | 310/323.02 |
| 2004/0207341 A1 | 10/2004 | Callahan | | 315/291 |
| 2004/0257007 A1 | 12/2004 | Lys et al. | | 315/294 |

OTHER PUBLICATIONS

"H-bridge using P and N channel FETs MOSFET H-Bridge Schematic" [online]. Blanchard, [retrieved on Jun. 17, 2005]. Retrieved from the Internet: <URL: www.armory.com//~rstevew/Public/Motors/H-Bridges/Blanchard/H-bridge.htm>.

"H-bridges: Theory and Practice" [online]. McManis, 2003, [retrieved on Jun. 17, 2005]. Retrieved from the Internet: <URL: www.mcmanis.com/chuck/robotics/tutorial/h-bridge/>.

* cited by examiner

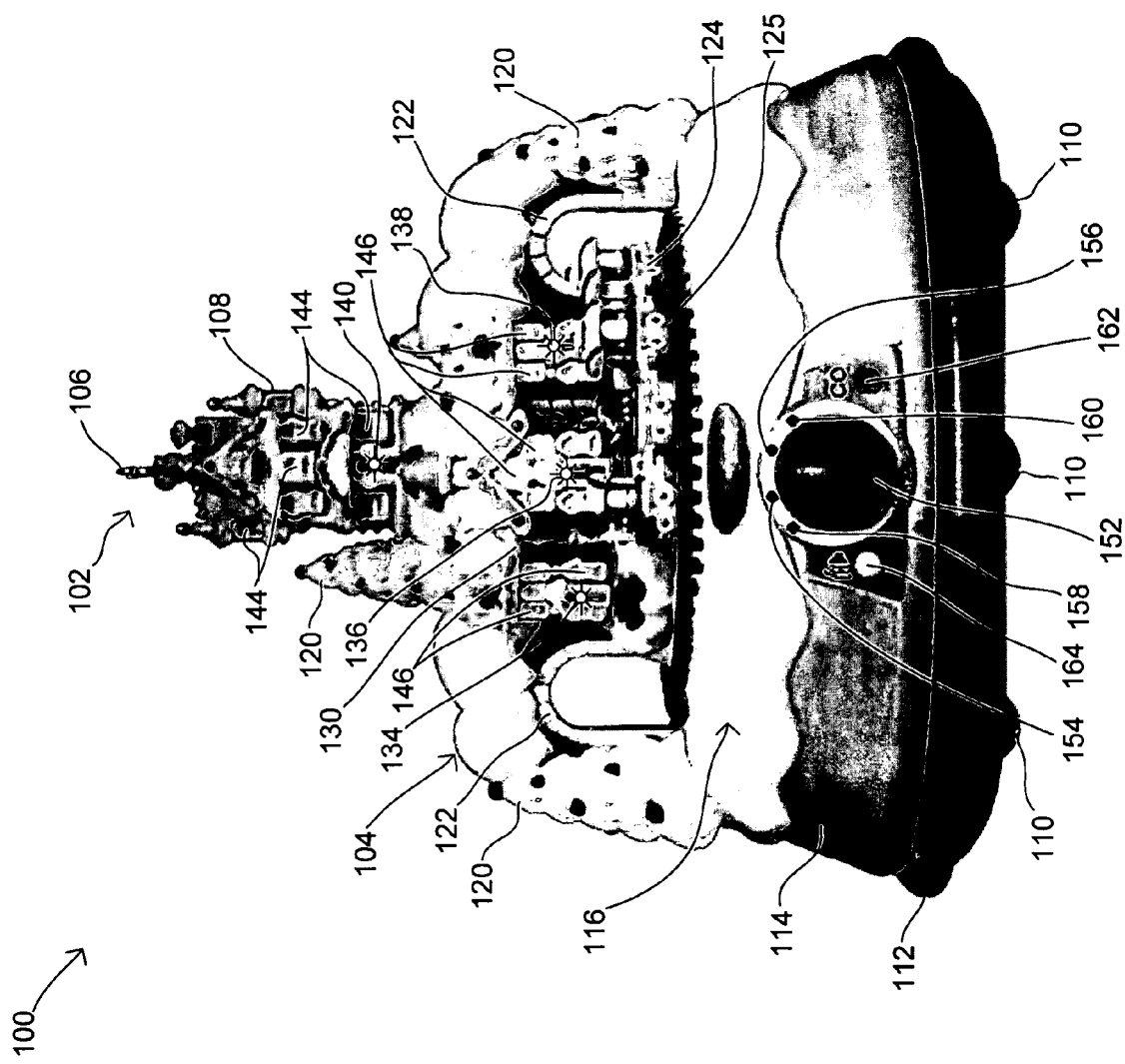

FIG. 1b

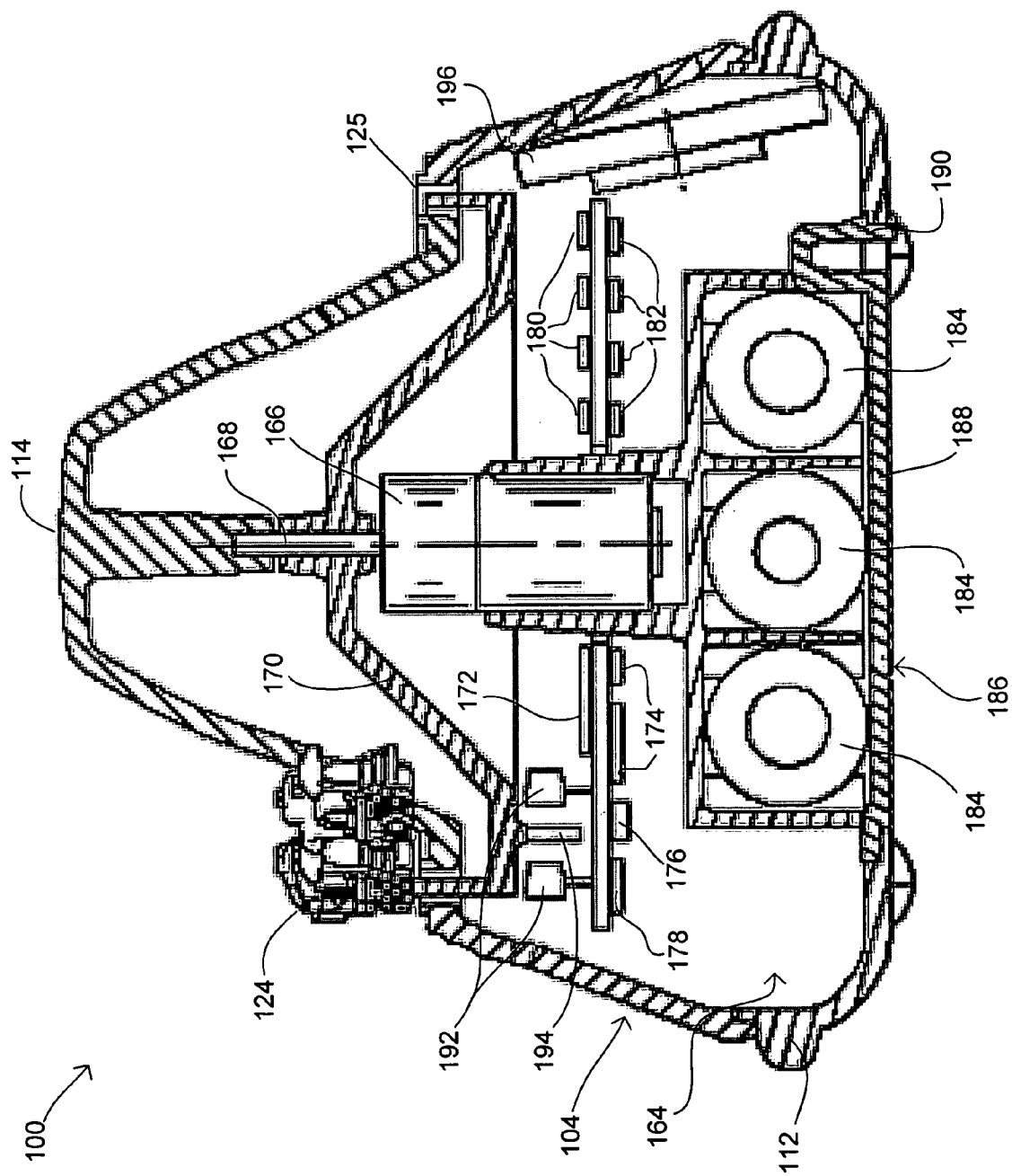

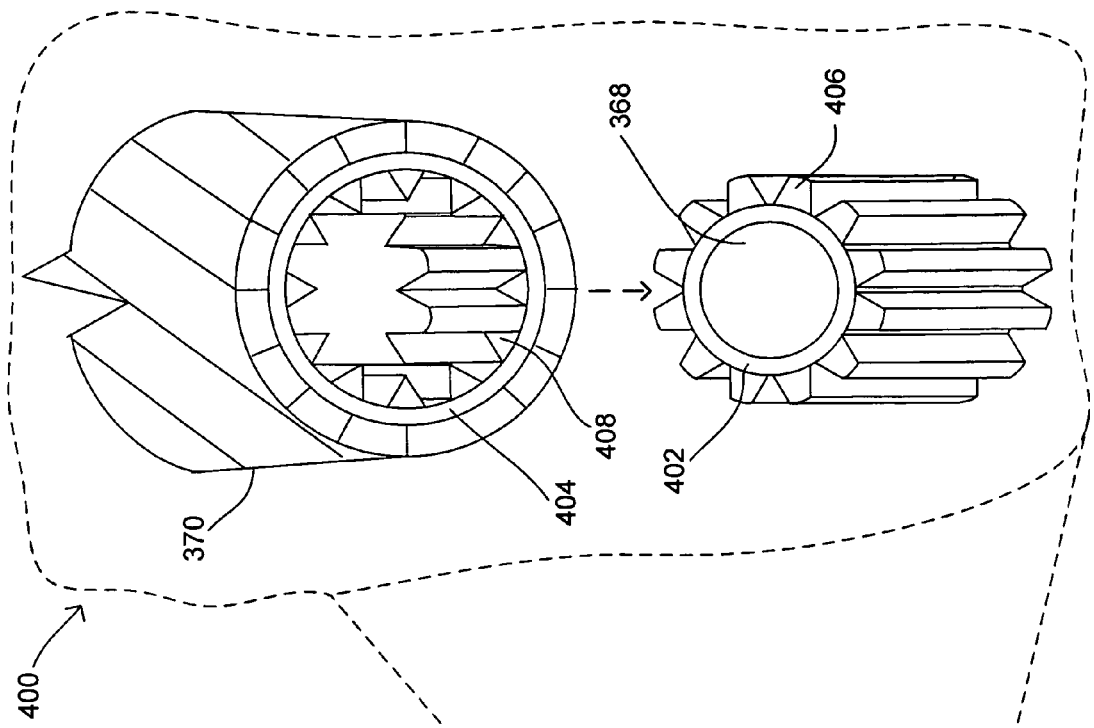
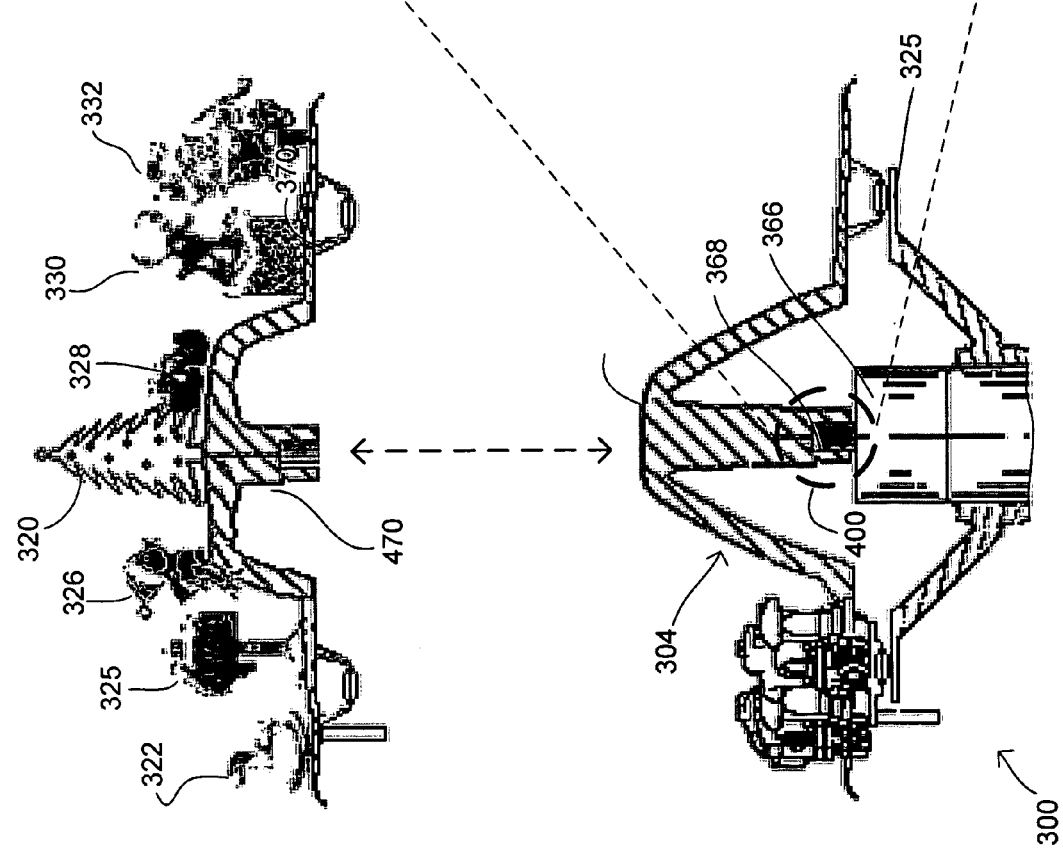
FIG. 4b
FIG. 4a

PULSE WIDTH MODULATION DRIVE AND METHOD FOR ORNAMENTS WITH MOVABLE COMPONENTS

BACKGROUND

Decoration devices may be used to enhance the appearance of a room or an object or to provide entertainment. For example, some decoration devices may be in the form ornaments that are hung from a wall, a mantle, or a tree so as to enhance the overall decorative appearance of that wall, mantle, or tree. In another example, a decoration device may be adapted to rest upon a tabletop or other surface and may provide entertainment for those viewing the device.

In some circumstances, decoration devices may include motion, colors, shapes, or lights to provide a appearance that is associated with a particular season, holiday, event, or theme. A powered ornament device may include at least one component that is movable relative to another component. For example, a traditional children's music box may include a figurine (e.g., a dancer) that rotates relative to a stationary base as a musical sound is emitted from the box.

Electrically powered, movable ornaments and other such decoration devices typically include an AC motor to drive the motion of the movable component. Such AC motors are typically driven off 120 V alternating current which is readily available in residential environments. The AC motors generally rotate at set rotational speed for a given load. That rotational speed often significantly exceeds that desired for ornament applications, so the AC motor output shafts have been coupled to gearbox in order to reduce the speed. With a decrease in shaft speed comes an increase in torque and this increased torque is usually substantially more than that required to drive the frictional and inertial loads in a typical ornament application.

Pulse-width modulation (PWM) controllers may be used in lieu of gearing to control motor speed, but PWM techniques have generally been considered unacceptable for ornament applications because the throttling necessary to achieve the appropriate shaft speed generally yields a torque that is insufficient to drive the ornament or to drive the ornament smoothly given variations in drive line friction. Moreover, use of PWM controlled motors would substantially increase manufacturing costs due to the combined cost of the PWM microcontrollers and the complex gear systems that would have be used to account for the low torque output of PWM controlled DC motors. For both of these reasons, AC motors with reduction gearing have been used in lieu of PWM controlled motors in ornament applications.

SUMMARY

A decoration device may include a low-friction drive line and a PWM-controlled motor that reduces or eliminates the gearing needed to achieve appropriate speed and torque at the motor output shaft. In preferred embodiments, the decoration device is an ornament that includes a low friction interfaces to accommodate relatively low torque output from the PWM driven motor. In certain embodiments, the PWM controller drives a DC motor at low speeds suitable for ornament applications. In other embodiments, the PWM controller may control the speed of an AC motor by adjusting the frequency of an alternating signal.

These and other embodiments may provide one or more of the following additional advantages. First, the a movable ornament of a decoration device may be driven using a PWM-controlled motor so that the acceleration and/or speed of the movable ornament is readily adjustable by the user. Second, the gearing necessary to achieve the appropriate rotational velocity may be eliminated or reduced, thereby reducing the net component costs. Third, because the gearing may be eliminated or substantially reduced, the gear noise emitted during the motion of the ornament may likewise be eliminated or reduced. Fourth, design flexibility may be achieved in that the same PWM controller and motor assembly may be used in a variety of different ornaments having different rotational velocity design parameters by simply modifying the nonvolatile memory settings in the PWM controller to achieve a different shaft speed.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1a is a front view of the decoration device in accordance with some embodiments of the invention.

FIG. 1b is a rear view of the decoration device of FIG. 1a.

FIG. 2 is a cross sectional view of the decoration device of FIG. 1a.

FIG. 4a is a cross sectional view of a portion of the decoration device of FIG. 3.

FIG. 4b is an enlarged view of a portion of the decoration device of FIG. 3.

Like reference symbols in the various drawings indicate like elements.

DETAILED DESCRIPTION OF ILLUSTRATIVE EMBODIMENTS

Figure 1B:
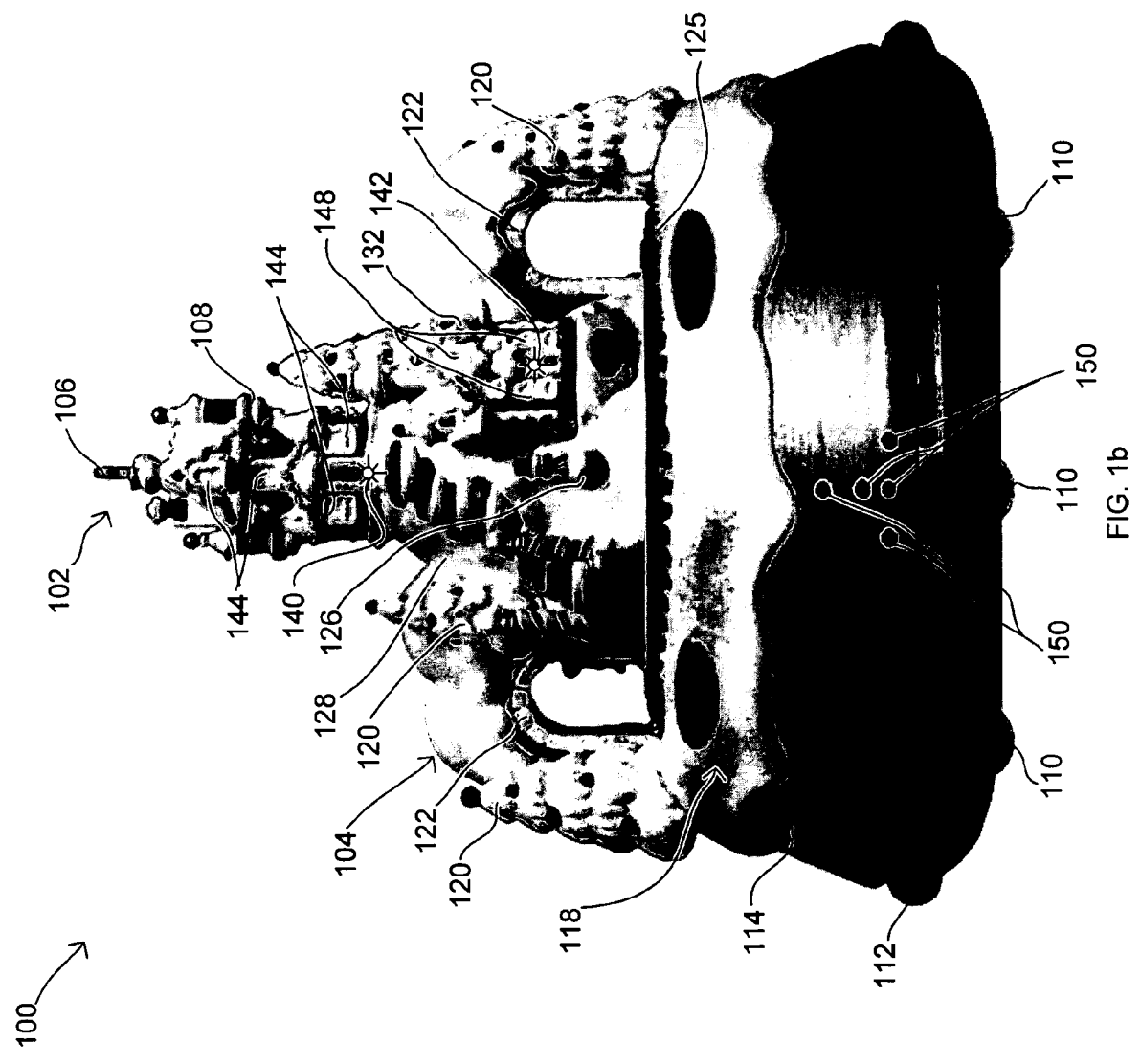
Figure 3:
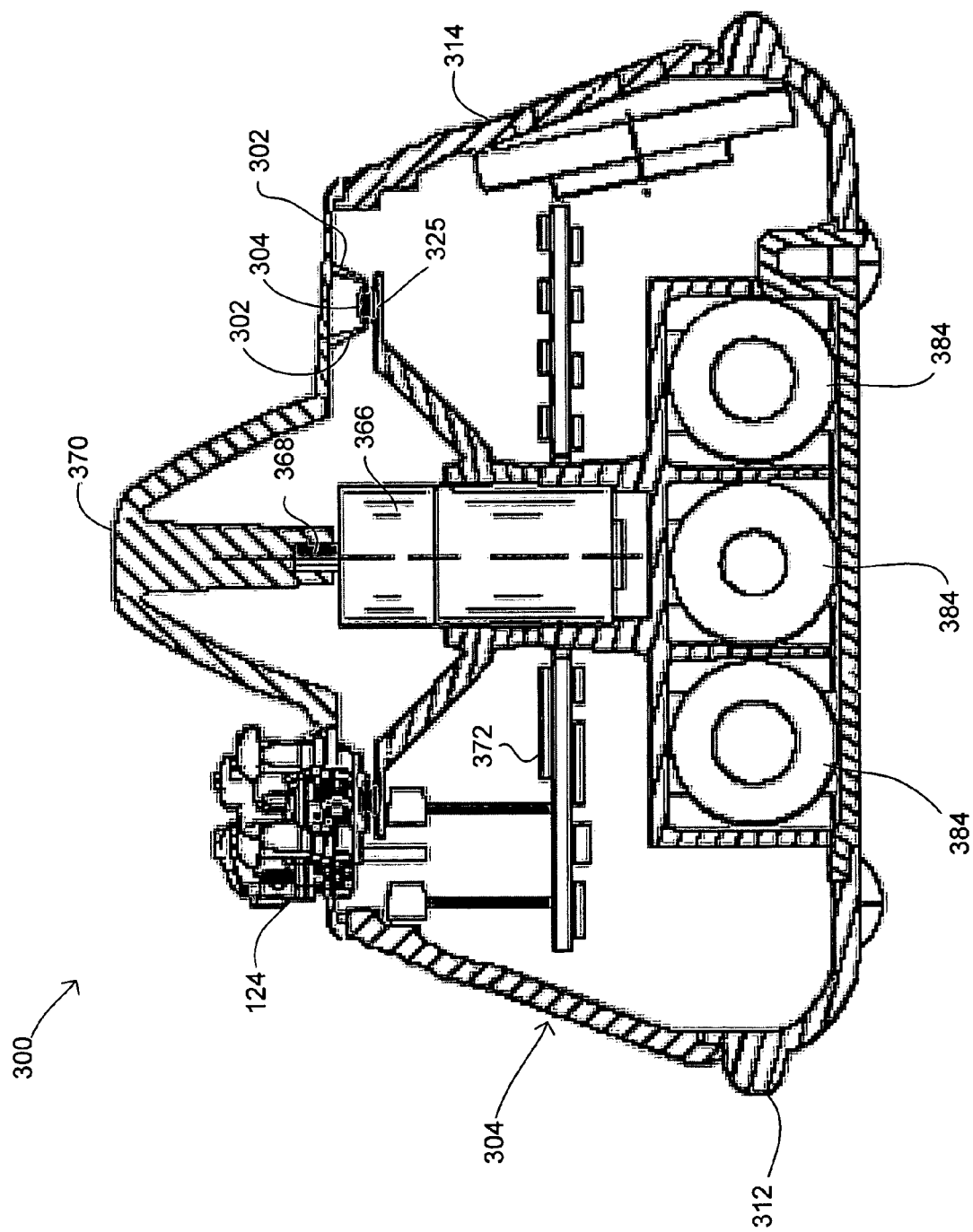
FIG. 3 is a cross sectional view of a decoration device in accordance with some embodiments of the invention.

Referring to FIGS. 1a and 1b, a decoration device 100 may include an attachment mechanism 102 and an ornament structure 104. In this embodiment, the attachment mechanism 102 comprises a metal ring 106. The metal ring 106 is coupled to a decorative element, such as Santa's Workshop 108 near the top of the ornament structure 104. As such, the attachment mechanism 102 may releasably couple the ornament structure 104 to an external object, such as a hook on a wall, a doorknob, a railing, or a branch of a Christmas tree. The ornament structure 104 may also include a plurality of stand-off feet 110 molded into a base portion 112.

The base portion 112 and a body portion 114 of the ornament structure 104 may be fixedly coupled so as to define a front portion 116 (FIG. 1a) and a rear portion 118 (FIG. 1b). The front portion 116 and the rear portion 118 may include one or more decorative elements that are configured to resemble patterns, characters, scenes, or words that may be associated with a particular season, event, or holiday. In this embodiment, the decorative elements on the front portion 116 and the rear portion 118 include a plurality of decorative Christmas trees 120, a plurality of snow covered railroad tunnels 122, a train 124, a substantially circular train track 125, a snowman 126, snow covered mountains 128, and a plurality of train stops including Santa's Workshop 108, Sleighbell Center 130, and Gumdrop Junction 132. Thus, in this embodiment the sum of the decorative elements may be associated with the Christmas holiday season. It should be understood that other embodiments of the decoration device 100 may comprise decorative elements other than the elements 108, 120, 122, 124, 125, 126, 128, and 130. For example, other embodiments of the decoration device 100 may comprise decorative elements that are associated with an event (e.g., a birthday celebration) or associated with a season or another holiday (e.g., the Winter season or the holiday of Halloween).

Still referring to FIGS. 1a and 1b, some of the elements of the front and rear portions 116 and 118, such as Santa's Workshop 108, Sleighbell Center 130, and Gumdrop Junction 132 may shed light on other portions of the ornament structure 104. The ornament structure 104 may be substantially hollow such that an internal space (shown in FIG. 2) is defined between the base portion 112 and the body portion 114. One or more internal light sources 134, 136, 138, 140, and 142 may be disposed at least partially in the internal space. The ornament structure 104 may comprise a substantially transparent or translucent, light transmissive, and flame resistant polymer material, such as ABS (acrylonitrile butadiene styrene), or SAN (styrene-based plastic). The ornament structure 104 may employ light from the internal light sources 134, 136, 138, 140, and 142 to provide lighting effects such as light-piping and edge lighting. In such circumstances, the front portion 116 and the rear portion 118 may have a low-level glowing effect. A translucent coating or paint coating may be applied to the exterior of the ornament structure 104 to enhance and control the quality of light that is emitted through the front and rear portions 116 and 118. The light emitted from the light sources 134, 136, 138, 140, and 142 may be transmitted through the material of the front and rear surface portions 116 and 118 so as to emit substantially brighter light through some of the decorative elements on the front and rear portions 116 and 118 of the ornament structure 104. In this embodiment, the decorative elements that emit light transmitted through the front and rear surface portions 116 and 118 include, but are not limited to, the windows 144 of Santa's Workshop 108, the windows 146 of Sleighbell Center 130, and the windows 148 of Gumdrop Junction 132.

A plurality of electrical components (described in more detail below) may be disposed within the ornament structure 104. The electrical components may impart movement, sound, light, or all three in combination to at least a portion of the device 100. The movement that may be imparted to a portion of the device 100 may comprise rotational, linear, circular, reciprocating or other movement along a predetermined path. Further, the movement or motion may be imparted by a direct current (DC) or alternating current (AC) motor that may be controlled by a control system (as shown, for example, in FIG. 6). The movement may be interactive in response to an external or internal input, such as the position of a selector switch, a sound sensor input, a light sensor input, a positional sensor input, or a pushbutton input. Additionally, the variation in the external or internal input signals may function in coordination with the control system. The control system may drive a control signal in response to the inputs that may variably operate the motor, an audio output system, a visual output system, or all three in unison. The audio output system may output sound in coordination with the variation in the control signal through a plurality of sound output ports 150 disposed on the rear portion 118 of the device 100. The visual output system may operate one or more of the previously mentioned light sources 134, 136, 138, 140, and 142 in coordination with the variation in the control signal.

In the embodiment shown in FIGS. 1a and 1b, motion may be imparted to the train 124. The movement of the train 124 may follow a substantially circular path that may be partially defined by the train tracks element 125. The audio output system may output voice and train sounds. The visual output system may operate the light sources 134, 136, 138, 140, and 142. The audio output system and the visual output system may be synchronized to the motion of the train 124.

A rotary selector switch 152 may be located on the front portion 116 (FIG. 1A) of the ornament structure 104. In this embodiment, the rotary selector switch 152 may be positioned in any one of four positions. The selector switch 152 positions may be numerically coded, color coded, or otherwise identified. In the embodiment of FIGS. 1a and 1b, the selector switch 152 positions are color coded and include switch position blue 154, switch position red 156, switch position green 158, and switch position yellow 160. Each of the switch positions may have a corresponding train movement cycle, train station destination, audio output (described, for example, in connection with FIG. 2), visual output pattern, or a combination thereof. For example, the switch position blue 154 has the train station destination Gumdrop Junction 132, a corresponding audio output, and turns on light source 142. The switch position red 156 has the train station destination Santa's Workshop 108, a corresponding audio output, and turns on light source 140. The switch position green 158 has the train station destination Sleigh Bell Center 130, a corresponding audio output, and turns on light sources 134, 136, and 138. The switch position yellow 160 has the train station destination Grand Tour (e.g., the train 124 travels along the tracks for a period of time past one or more of the previously described destinations 108, 130, 132), a corresponding audio output, and turns on light sources 134, 136, 138, 140, and 142. After setting the selector switch 152 to one of the four positions 154–160 and pressing the "GO" pushbutton 162 located to the right of the selector switch 152, a new train movement cycle will start. Pressing the "Sound Effects" pushbutton 164 to the left of the selector switch 152 will play one of the audio output system train 124 sound effects.

Referring to FIG. 2, the decoration device 100 may have an internal space 164 that separates the front and rear portions 116 and 118 of the ornament structure 104. As previously mentioned, a plurality of electrical components may be disposed within the internal space 164 of the ornament structure 104. The electrical components may include a printed circuit board (PCB), a plurality of light emitting diodes (LEDs) or incandescent light bulbs, a speaker, a DC current motor, an AC current motor, integrated circuits (ICs), a power supply, or the like.

The movement may be imparted to the train 124 by a DC motor 166 that is coupled to the base 112 of the ornament structure 104. The DC motor 166 may be subject to a low rotational friction load that may allow for a reduction in the size of the power supply. The DC motor 166 may include an output shaft 168 that rotates when the motor is driven by electrical energy. A spindle member 170 may couple the shaft 168 to the train 124 so that the train 124 moves when the shaft 168 rotates. Sources of frictional load on the motor 166 may include the internal friction imparted on the motor 166 by the axial load of the spindle 170 and the kinetic friction of the train element 124 sliding on the train track element 125. As described in more detail below, the friction load on the motor may be substantially reduced to permit the motor 166 to consistently rotates even at low torque levels.

In some embodiments, the control system for the device 100 may comprise a plurality of ICs including a power supply IC 172, a microcontroller 174, an amplifier 176, a memory IC 178, a plurality of high side or low side switches, a plurality of reverse protection diodes 182, or other. The ICs 172, 174, 176, 178, and 182 may be surface mounted or through-hole mounted to a PCB 184 disposed within the internal space 164.

In this embodiment, the power supply IC 172 may be electrically coupled to the input terminals of the DC motor 166 and may supply a DC voltage waveform having a variable duty cycle. The microcontroller 174 may generate a control signal to control the duty cycle, wherein the train 124 moves in response to the rotation of the motor 166. The device 100 may be powered by a DC or an AC power supply. As shown, the device receives power from batteries 184 so that the device can be conveniently portable. The batteries 184 may be releasably contained within a battery compartment 186 located on the bottom of the base portion 112. The battery compartment 186 may contain a battery cover 188 that may be removed to access the batteries 184. The battery cover 188 may be removed by releasing a molded spring snap 190 closure. In other embodiments, the battery cover 188 may be releasably mounted to the battery compartment 186 by other means, such as a screw or a rotatable locking mechanism. If an AC power source is used, the device 100 may include an AC/DC adapter or a rectifier circuit to provide power to the DC motor.

The power supply IC 172 of FIG. 2 may generate waveforms that include a pulse-width-modulation (PWM) circuit, a pulse-density-modulation (PDM) circuit or a pulse-frequency-modulation (PFM) circuit to generate the voltage waveform to control the rotational speed and direction of the motor 166. In this embodiment, the power supply IC generates a PWM waveform to control the rotational speed and direction of the DC motor 166. It should be understood that, in other embodiments, the PWM circuit may control the speed of an AC motor by adjusting the frequency of the input voltage. The maximum duty cycle of the waveform may be up to 100 percent duty cycle. For example, the operating duty cycle for the PWM waveform may be between 50 and 100 percent, and the minimum operational duty cycle required to impart movement may be at least 5 percent duty cycle. The minimum duty cycle required may be a function of the friction load on the motor 166, which may be substantially reduced as described in more detail below.

The microcontroller 174 may vary the PWM control signal according to a predetermined profile stored in the memory IC 178. The microcontroller 174 may further vary the PWM control signal in response to an external or internal input. Sources of external input may include the rotary selector switch 152, the "GO" pushbutton 162, or the "Sound Effects" pushbutton 164. Other embodiments may include photoelectric sensors or infrared sensors to trigger an input in response to light or motion, respectively. Further sources on inputs may comprising a data interface to receive programming or control signals, to synchronize motion, sound or light with other decoration devices, to allow for communication with an external controller, or otherwise. The data interface may comprise a wireless interface, a serial interface, or an radio frequency interference (RFI). Sources of internal input may include photo cell position data, position based on encoder data or other similar sensor data. In this embodiment, the input data for the position of the train 124 is monitored by two photo cell position sensors 192. The photo cell position sensor 192 motion control may provide positional feedback to the microcontroller 174 for stopping the train 124 at the selected train station 108, 130, 132. A trigger arm 194 aligned with the train may be mounted at the base of the spindle 170. The trigger arm 194 triggers the photo cell position sensors as to the position of the train 124. A set of the photo cell position sensors 192 may be mounted proximal to each of the 3 train stations 108, 130, and 132. Alternatively, the spindle 170 may include a ring with slits or hole formed therein may be used to indicate the position of the train 124. For example, the ring may have spaced apart slits that are detected as each slit moves past the photo cell position sensors 192. The location of the train 124 may be determined by counting the number of slits that have passed the photo cell position sensors 192.

Still referring to FIG. 2, the train 124 may be programmed to stop at any one of the three train stations 108, 130, or 132 by setting the rotary selector switch 152 to the blue, red, or green switch position 154–158. Any one of the three train stations 108, 130, or 132 may be selected using the rotary selector switch 152 (FIG. 1a). Once the train station 108, 130, or 132 has been selected, pressing the "GO" pushbutton 162 may initiate the motion, sound and light control cycle. For example, pressing the "GO" pushbutton may trigger the train 124 to accelerate (e.g., over a 90 degree rotation in approximately 3 seconds) up to a full speed of 5 seconds per clockwise revolution. In this example, the train 124 may go at least one 360 degree revolution around the base of the ornament structure 104. The train 124 may then decelerate (e.g., over a 90 degree rotation, in approximately 3 seconds) and stop at the selected train station. Setting the rotary selector switch 152 to switch position yellow 160 may provide an approximately 60-second "Grand Tour" train ride including acceleration and deceleration. On the "Grand Tour" the audio output system plays a song, and the light sources 134, 136, 138, 140, and 142 turn on/off in a pattern that appears to chase the train 124.

In this embodiment, the internal light sources 134, 136, 138, 140, and 142 include five yellow LEDs placed facing up in the bottom of each of the 5 buildings. For example, three light sources 134, 136, and 138 are located at Sleighbell Center 130, one light source 140 is located at Santa's Workshop 108, and one light source 142 is located at Gumdrop Junction 132.

The audio output system may be include the previously mentioned amplifier 176 and a speaker 194. In this embodiment, the audio output system includes an inner magnet speaker 196 using a Digital-to-Analog-Conversion (DAC) speaker output from a Voice Chip amplifier 176.

The cycles of motion, sound and lights in this embodiment for the programmed stops at Gumdrop Junction 132 (switch position blue 154), Santa's Workshop 108 (switch position red 156), and Sleigh Bell Center 130 (switch position green 158) include a voice generated by the audio output system that announces the selected train station 108, 130, or 132 destination. Also, the corresponding train station 108, 130, or 132 light sources 140, 134–138, or 142, respectively, may flash. In one example, the train 124 sounds may be generated by the audio output system as the train 124 accelerates to full speed. The train 124 sounds may continue while the train 124 is moving. The train 124 decelerates and stops after the selected train station 108, 130, or 132 destination is detected 2 times by the photo cell position sensor 192 that corresponds to the selected train station 108, 130, 132 destination. Thus, in this embodiment, the train 124 may circle the entire train track 125 at least once. The train 124 sounds and the voice plays once the train 124 stops at the selected train station 108, 130, 132 destination. The light sources 140, 134–138, or 142 for the respective selected train station 108, 130, 132 destination turn on. All the light sources 134–142 cycle at the end of the sound cycle and then turn off.

The cycle of motion, sound, and lights for the programmed cycle for the Grand Tour/Free Play (switch position yellow 160) may have different implementations. In this embodiment, the final train destination may include one or all of three programmable train stations 108, 130 and 132. For example, the final train station 108, 103, or 132 includes the train station 108, 130, 132 from which the Grand Tour begins. The train 124 sounds are generated by the audio output system as the train 124 accelerates to full speed. Once at full speed, the audio output system plays a song, such as the "Rock Candy Railroad Theme" song. The light sources 134–142 turn on/off in a pattern that appears to chase the train 124. Once the song is finished, the light sources 134–142 turn on constant. After the song finishes, the train 124 decelerates and stops the first time the destination marker is detected by the photo cell position sensors 192 at the destination train station 108, 130, or 132. The train 124 sounds and the voice announces the train station 108, 130, 132 once the train 124 stops at the destination train station 108, 130, or 132. All light sources 134–142 cycle at the end of the sound and then turn off.

In the previously described example, during any sound or motion, the trigger inputs 154–164 associated to the push buttons 162–164 and the rotary selector switch 152 are disabled. The trigger inputs 154–164 may be re-enabled when the cycle of sound, lights and motion stops.

Referring to FIG. 3, a embodiment of a decoration device 300 may have a reduced friction load. The body portion 314 and the spindle assembly 370 may include a plurality of decorative elements similar to the elements in FIGS. 1a and 1b. For example, the decoration device 300 may include a train element 124. The sum of the decorative elements may be associated with a holiday season such as Christmas. In addition, the decoration device 300 may include light sources and a selector switch 152, similar to the decoration device 100 shown in FIG. 1a.

The movement in the ornament structure 304 may be imparted to the train 124 and the spindle assembly 370 by a DC motor 366, which may be fixedly coupled to the base 312 of the ornament structure 304. The DC motor 366 may include an output shaft 368 that rotates to cause the train 124 to move relative to the base 312. The spindle assembly 370 and train 124 may be releasably coupled to the shaft 368, as described in more detail below. The weight of the train 124 and the spindle assembly 370 may be substantially supported by a support arm 302 and roller assemblies 304. The support arm 302 and roller assemblies 304 may be fixedly connected to the spindle assembly 370, and the rollers 304 may be rotatably coupled to the support arms 302. The roller assemblies 304 may roll upon a track assembly 325, both of which may comprise a low friction material, such as a polymer (e.g., Polytetrafluoroethylene, Nylon, Polycarbonate, Polybutylene Terephthalate, Polyethylene Terephthalate, Polyetherimide, composites thereof, or the like) that may have a TEFLON coating or a MOLYKOTE coating. The track assembly 325 may be fixedly coupled to the base portion 312 of the ornament structure 304.

Alternatively, other embodiments of the decoration device 300 do not use roller assemblies 304 to provide a reduced friction load on the DC motor 366. Rather, the support arm 302 may include a surface that slidably engages a complementary surface of the track assembly 325. In such embodiments, the sliding surface of the support arm 302 may comprise a low friction material, such as a polymer with a low-friction coating (e.g., TEFLON coating or a MOLYKOTE coating), that slidably engages the low friction material of the track assembly 325. For example, in some embodiments, the kinetic coefficient of friction between the sliding surfaces may be less than 0.5. In certain exemplary embodiments, the kinetic coefficient of friction between the sliding surfaces may be about 0.03 to about 0.4. In other embodiments, the kinetic coefficient of friction between the sliding surfaces may be about 0.03 to about 0.3. In still other embodiments, depending upon the material selection previously described, the kinetic coefficient of friction between the sliding surfaces may be about 0.03 to about 0.2.

In this embodiment, the weight of the train 124 and the spindle assembly 370 may be substantially supported by the contact of the rollers 304 and the low friction track 325. As a result, the DC motor 366 may be subject to a lower total friction load, thereby permitting the DC motor to rotate in a consistent manner even at substantially low torque levels. The lower total friction load may allow for an even greater reduction in the capacity of the power supply IC 372, the battery 384 capacity as well as a reduction in the size of the DC motor 366.

In some embodiments a DC motor controlled by a PWM circuit may operate at substantially low torque levels. In such circumstances, a high friction load upon the motor may be great enough to stop or stutter the motion of the motor's output shaft 368. In this embodiment, the friction load on the DC motor 366 is substantially reduced due to the low friction engagement between the rollers 304 and the track assembly 325, or alternatively, the low friction engagement between the sliding surfaces of the support arm 302 and the track assembly 325. Again, the low friction roller engagement or the low friction slidable engagement may each provide a reduced friction load on the DC motor 366. In the embodiment shown in FIG. 3, the frictional resistance to the DC motor's 366 rotation is substantially reduced, thereby permitting the DC motor 366 to operate under control of a PWM circuit even though the DC motor 366 may be operating at low torque levels.

In addition to reducing the kinetic friction, the axial load on the DC motor 366 may be reduced (which may reduce the internal friction load of the DC motor 366) because the weight of the spindle assembly 370 is substantially supported by the track assembly 325. As described in more detail below, the output shaft 368 of the DC motor 366 may use a spline connection (e.g., FIG. 4b) to engage the spindle assembly 370. In such embodiments, the DC motor 366 may drive the rotational movement of the train 124 without necessarily bearing an axial load from the weight of the spindle assembly 370.

Other means to reduce drive line friction include TEFLON or MOLYKOTE coated bushing and mechanisms that suspend the movable component such that it does slide against any other component of the ornament. In one example, a wire coupled to the motor shaft projects upwardly and outwardly through a circumferential slit in the ornament housing. The movable component is disposed on the distal end of the wire such that as the shaft rotates the movable component is articulated substantially without bringing the wire into contact with the ornament housing.

Referring to FIG. 4a, the decoration device 300 may include a removable assembly 370. The spindle assembly 370 may be removed from the ornament structure 304 by sliding the spindle assembly 370 away from the shaft 368 in a substantially axial direction (e.g., substantially upward in the view shown in FIG. 4a). An alternate design of a spindle structure 470 may be releasably coupled to the ornament structure 304 in place of the first spindle assembly 370. For example, the first spindle assembly 370 may include a first theme associated with the Christmas holiday season, and the alternate spindle assembly 470 may include a second theme associated with a different holiday (e.g., New Year's Eve or Valentine's day), season (e.g., the Winter season), or event (e.g., a birthday celebration). In this embodiments, the alternate spindle assembly 470 may be installed by sliding it onto the shaft 368 in a substantially axial downward direction relative to the ornament structure 304.

The alternate spindle assembly 470 may include one or more decorative elements that are configured to resemble patterns, characters, scenes or words that may be associated with a particular season or holiday. In this embodiment, the decorative elements on spindle assembly 470 include a decorative Christmas tree 120, a rocking horse 322, a north pole sign 324, a bird with a wool cap and scarf 326, a plurality of Christmas present 328, a reindeer in a snow covered chimney 330, and a dancing Santa Claus 332. In certain embodiments, the sum of the decorative elements may be associated with the Christmas holiday season so that both the first spindle assembly 370 and the alternate spindle assembly 470 may be displayed interchangeably during the Christmas holiday season. In other embodiments, the decorative elements of the alternative spindle assembly 470 may be associated with a different holiday season. For example, a user may display the first spindle assembly 370 during the Christmas holiday season, and then the user may replace the first spindle assembly 370 with the alternate spindle assembly 470 that could be associated with the New Year's Eve holiday. Thus the decoration device 300 is readily adapted for use during multiple holidays, seasons, or events.

Referring to FIG. 4b, a spline assembly 400 may releasably couple the spindle assemblies 370 and 470 to the shaft 368. The spline assembly 400 includes a male spline 402 fixedly coupled to the outer diameter of the shaft 368 and a female spline 404 fixedly coupled to the inner diameter of the end of the spindle assembly 370. It should be understood that the alternate spindle assembly 470 include a similar female spline 404. The internal spline members 406 and the external spline members 408 are sized so as to allow the male and female splines 402 and 404 to mate with one another, thereby releasably coupling the spindle assembly 370 or 470 to the ornament structure 304. In alternate embodiments, the coupling mechanism may be otherwise and may include mating assemblies such as square, hexagonal, or threaded couplings.

Because the spline connection causes the motor shaft 368 to be rotationally stationary relative to the spindle assembly 370 or 470, the DC motor 366 may cause the spindle assembly 370 or 470 to rotate. However, because the spline connection causes the motor shaft 368 to be axially slidable relative to the spindle assembly 370 or 470. The DC motor 366 does not necessarily bear an axial weight load from the spindle assembly 370 or 470 (bearing upon the track assembly 325), which may reduce the internal friction imposed upon the DC motor 366.

Figure 5:
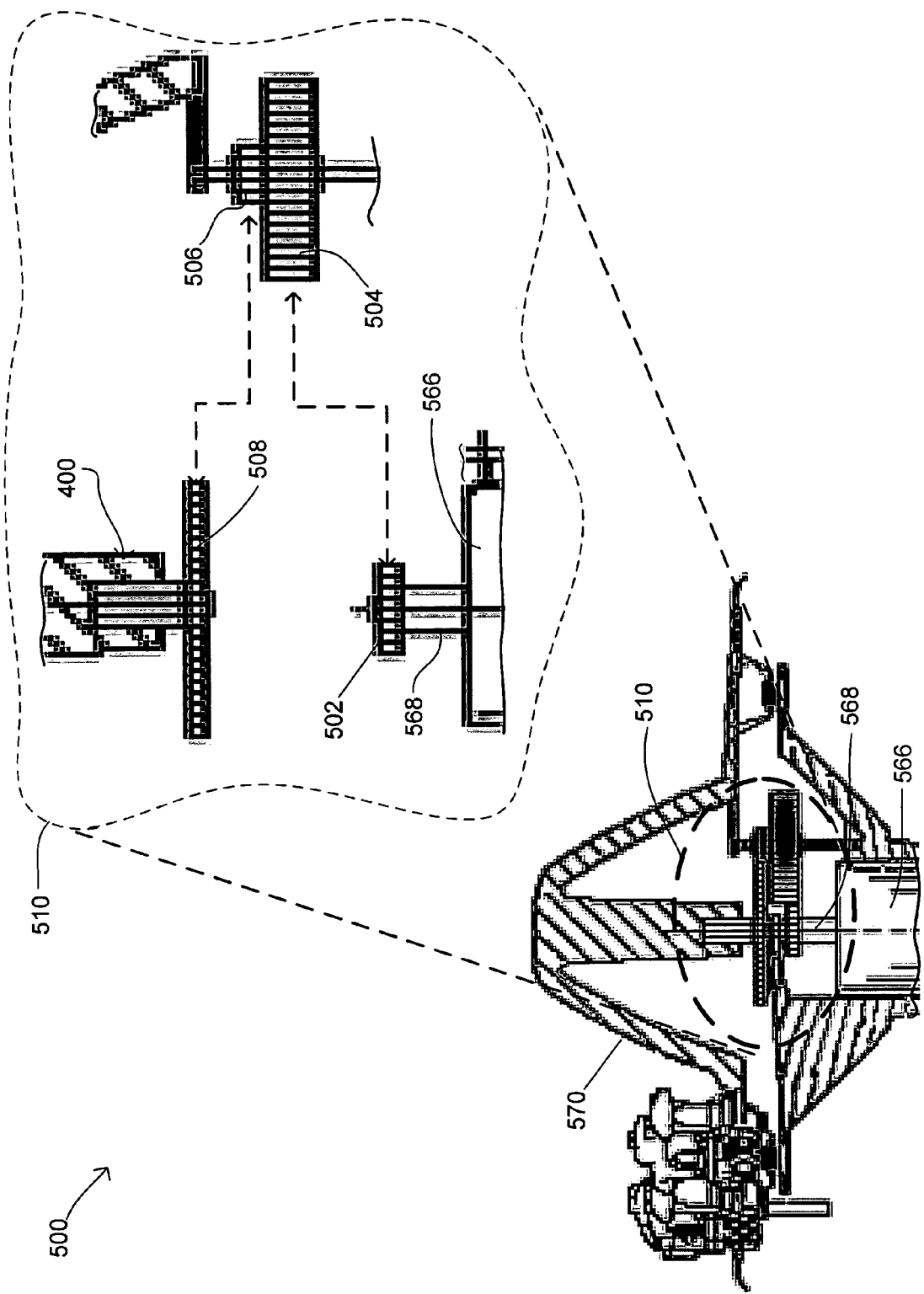
FIG. 5 is an enlarged view of an alternate embodiment of a portion of the decoration device of FIG. 3.

Referring to FIG. 5, an alternate embodiment of the decoration device 500 is shown wherein the output shaft 568 of the motor 566 is coupled to the spindle assembly 570 via a gear system 510. In this embodiment, the gear system 510 includes gears 502, 504, 506, and 508. The gear 502 is fixedly coupled to the shaft 568 and may impart movement via gear 504, gear 506, and gear 508 to at least a portion of the decoration device 500. The gear 508 may be coupled to at least a portion of a spline assembly (refer, for example, to the spline assembly 400 of FIG. 4b) so that the spindle assembly is removable. The motion imparted by the motor 566 through the shaft 568 and the gears 502–508 may rotate the spindle assembly 570 at a speed that is proportionally reduced from the speed of rotation of the motor's output shaft 568.

Similar to the embodiment of FIG. 3, this embodiment may provide a reduced friction load on the motor 566. For example, the shaft 568 of the motor 566 may bear a substantially reduced axial load from the weight of the spindle assembly 570, which bears upon a track assembly (similar to the track assembly 325 of FIG. 3). Further, the spindle assembly 570 may include rollers or low friction sliding surfaces to reduce the rotational friction load upon the motor 566, as previously described in connection with FIG. 3. This may allow for the use of a smaller motor 566, and a reduction in the capacity of the power supply IC 372 and the battery 384. Moreover, the reduced friction load on the DC motor 566 may permit the DC motor 566 to operate at low torque levels.

Figure 6:
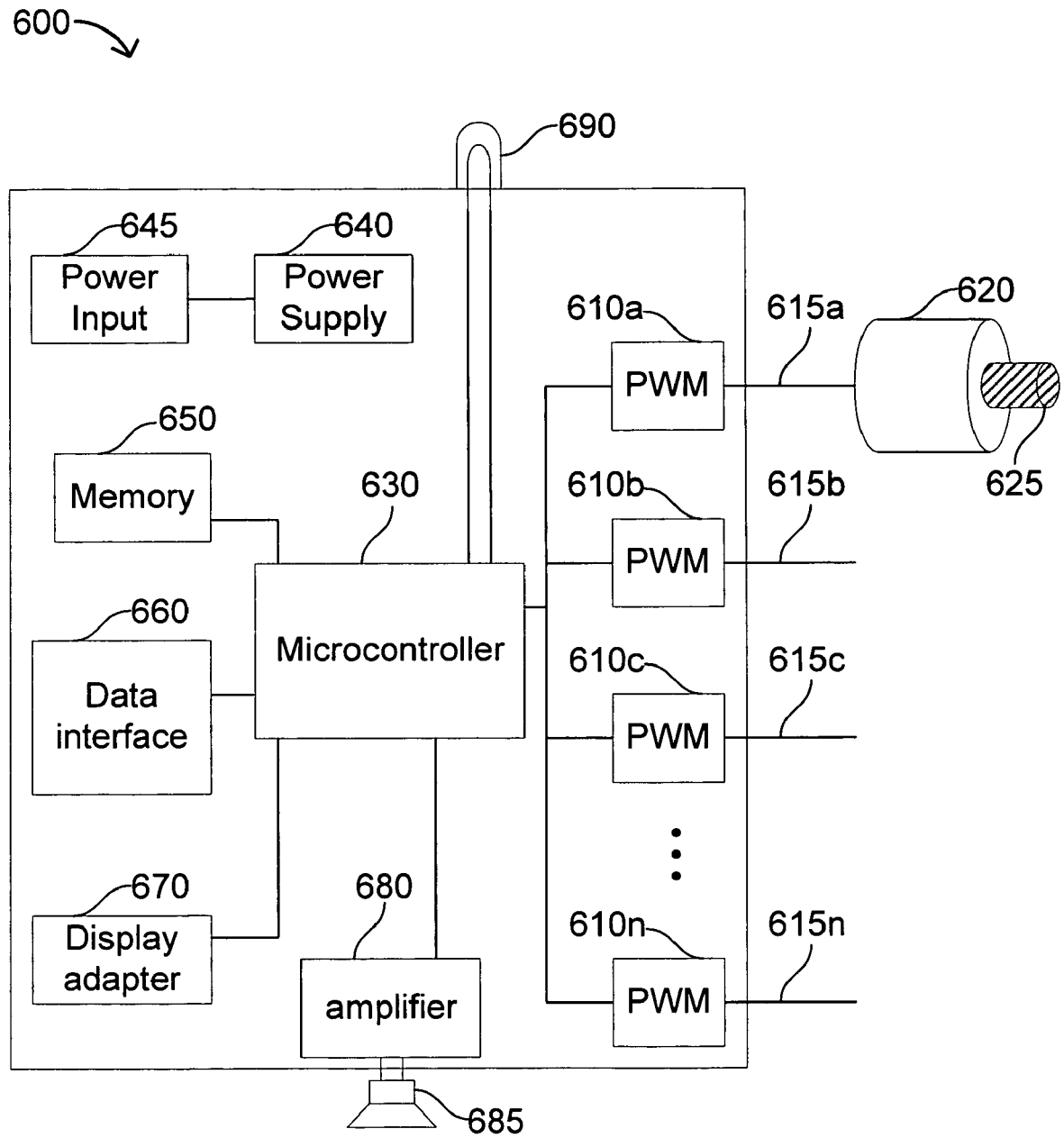
FIG. 6 is a block diagram of a controller in accordance with some embodiments of the invention.

FIG. 6 shows an embodiment of a controller 600 that may provide controlled voltage or current to set a decoration device (e.g., device 100, 300, or 500) into motion. The controller 600 may include pulse width modulator (PWM) circuits 610a, 610ab, 610ac, and 610 an, each of which can output a controlled voltage waveform capable of driving a DC motor 620 (which may be similar to the DC motors 166, 366, and 566 in the previously described embodiments) that is coupled to PWM output ports, 615a, 615b, 615c, and 615n, respectively. In some embodiments, other types of loads may be connected to one or more of the ports 615a–615n. For example, loads such as a light string, LED's, or audio output devices may be connected to the ports 615a–615n and driven by the corresponding PWM circuits 610a–615n. Also, in other embodiments, the decoration device may comprise an AC motor, and one or more PWM circuits may control the speed of the AC motor by adjusting the frequency of the supply voltage.

In this example, PWM circuit 610a is connected to the DC motor 620, which may be coupled to move a figurine or decorative element (e.g., a train element 124), as described, for example, in connection with the decoration devices 100, 300, and 500. The PWM 610a may be operated to supply a controlled voltage waveform to cause the DC motor 620 to output a controlled amount of electromagnetic torque to the shaft 625. An exemplary implementation of a PWM circuit will be described in detail below.

For example, the PWM circuit 610a may include circuitry to generate a square wave voltage waveform by switching its output terminals between a high-side supply rail voltage and a low-side supply rail voltage at a predetermined switching frequency. The voltage waveform can be defined by a voltage applied to the terminals and a duty cycle. In one example, the PWM circuit 610a may output a waveform with a 50% duty cycle, which corresponds to the PWM circuit 610a connecting its output terminal to the high side supply rail voltage for 50% of the period of the waveform, and then connecting its output terminal to the low side supply rail voltage for the remainder of the period. According to this example, the average voltage output by the PWM circuit 610a would be approximately 50% of the high side supply rail voltage. At an appropriate frequency range, the DC motor 620 will perceive the output voltage as an average of the on and off voltages over the time period applied to the DC motor 620 and may be controlled so as to achieve a desired rotational speed. The duty cycle may be varied to obtain a corresponding variation in the rotational speed, and thus obtain a controlled motion profile for the devices 100, 300, and 500. For example, the PWM circuit 610*a* may also produce voltage waveforms of 30% duty cycle, 80% duty cycle or 100% duty cycle. Each PWM circuit 610*a*–610*n* may be set to operate at the same or different switching frequencies. The frequency modulation range is typically between 100 Hz to 5 kHz. Depending on the motor selection, the frequency modulation range may be higher, for example, between 5 kHz and 1 MHz.

In alternative embodiments, the PWM circuits 610*a*–610*n* can be modified to operate using other suitable modulation techniques, such as pulse frequency modulation (PFM), pulse amplitude modulation (PAM), or hysteretic (bang—bang) control. For bi-polar power supply rails, a three-level voltage (positive, zero, negative) modulation may be employed, which may have benefits including reduced harmonic content and increased efficiency. In addition, other methods may be implemented in combination with the selected modulation techniques, such as current-mode control, regenerative braking (energy recovery), and the like.

In response to the control signals from the controller 600, the PWM 610*a* can increase and decrease the speed of the DC motor 620 by respectively increasing and decreasing the duty cycle of the output waveform. This enables the DC motor 620 to provide different amounts of torque for the devices 100, 300, and 500 of different physical sizes.

For example, the PWM circuit 610*a* may be used to operate the DC motor 620 to move the decorative elements as described in connection with the decoration devices 100, 300, and 500, at a constant speed, at a randomly determined speed, or at a speed according to a predetermined speed profile (e.g., so as to accelerate and/or decelerate at a certain rate for a predetermined period of time, or to move at a first speed during a first period of time and then move at a second speed during a second period of time). In an alternative embodiment, the controller may operate the DC motor according to a randomly varying profile to cause the motion of for the devices 100, 300, and 500 to vary in unpredictable ways. In one embodiment, the system can be used to impart movement to a decorative element such as the train element 124 (FIG. 1*a*, 3, or 5). The speed of the train 124 may increase, then decrease as it approaches a model train station 108, 130, or 132 (e.g., FIGS. 1*a* and 1*b*) or a switch point in the train tracks. Optionally, the PWM 610*a* voltage may be used to modulate the light intensity of a light on the train, or lights on the train tracks.

In another example, the PWM 610*a* can be connected to a decorative light or light string in order to vary the operation time, operation sequence, or brightness.

A microcontroller 630 can be used to monitor and control the operation of the PWMs 610*a*, 610*b*, 610*c*, 610*n*. The microcontroller 630 can include a microprocessor and related circuitry for controlling the functions and components of the controller 600. The microcontroller 630 can execute software instructions associated with the operation of the components of the controller 600 and the software instructions for the decoration device 100, 300, or 500. The software instructions can be stored in a memory 650 which is connected to the microcontroller 630. For example, the memory 650 may include read only memory (ROM), random access memory (RAM), magnetic or optical storage, or a combination thereof.

A power supply 640 provides operating DC voltages such as 12V, 5V, 3.3V, 2.5V, 1.8V, 1.5V, and 1.2V, to the various components within the device manager 600, and it may also provide differential voltage signals. A power input circuit 645 receives power from outside the device manager 600. If the power input circuit 645 receives an alternating current (AC) signal, then it can include a transformer and rectifier to convert the AC signal to a direct current (DC) signal. The power input circuit 645 may include protection circuitry, over-voltage protection such as a fuse, and filtering.

A data interface 660 is connected to the controller 630. The data interface 660 can be used for uploading or downloading software instructions to and from the controller 630 and the memory 650, or for operating the device manager 600. The data interface 660 can receive data via radio frequency (RF) wireless transmission such as Bluetooth, infrared data transmission, a universal serial bus (USB) port, a keypad or keyboard. The data interface 660 can also include sensors for sound and light such that the controller may activate or deactivate one or more of the PWMs 610*a*, 610*b*, 610*c*, 610*n* based on the amount of input sound vibrations, such as a handclap or music, and the amount of visible light, such as sunlight. A display adapter 670 is connected to the microcontroller 630 and may be used to send information to a display device such as a CRT display, flat panel display, LCD or LED display, or similar display device. The microcontroller 630 can be connected to an amplifier 680 that can output a signal to a speaker 685 to provide sound. A status indicator 690 is connected to the microcontroller 630. The status indicator 690 may be one or several lights or light emitting diodes (LED) and can represent the present operating status of the controller 600.

Figure 7:
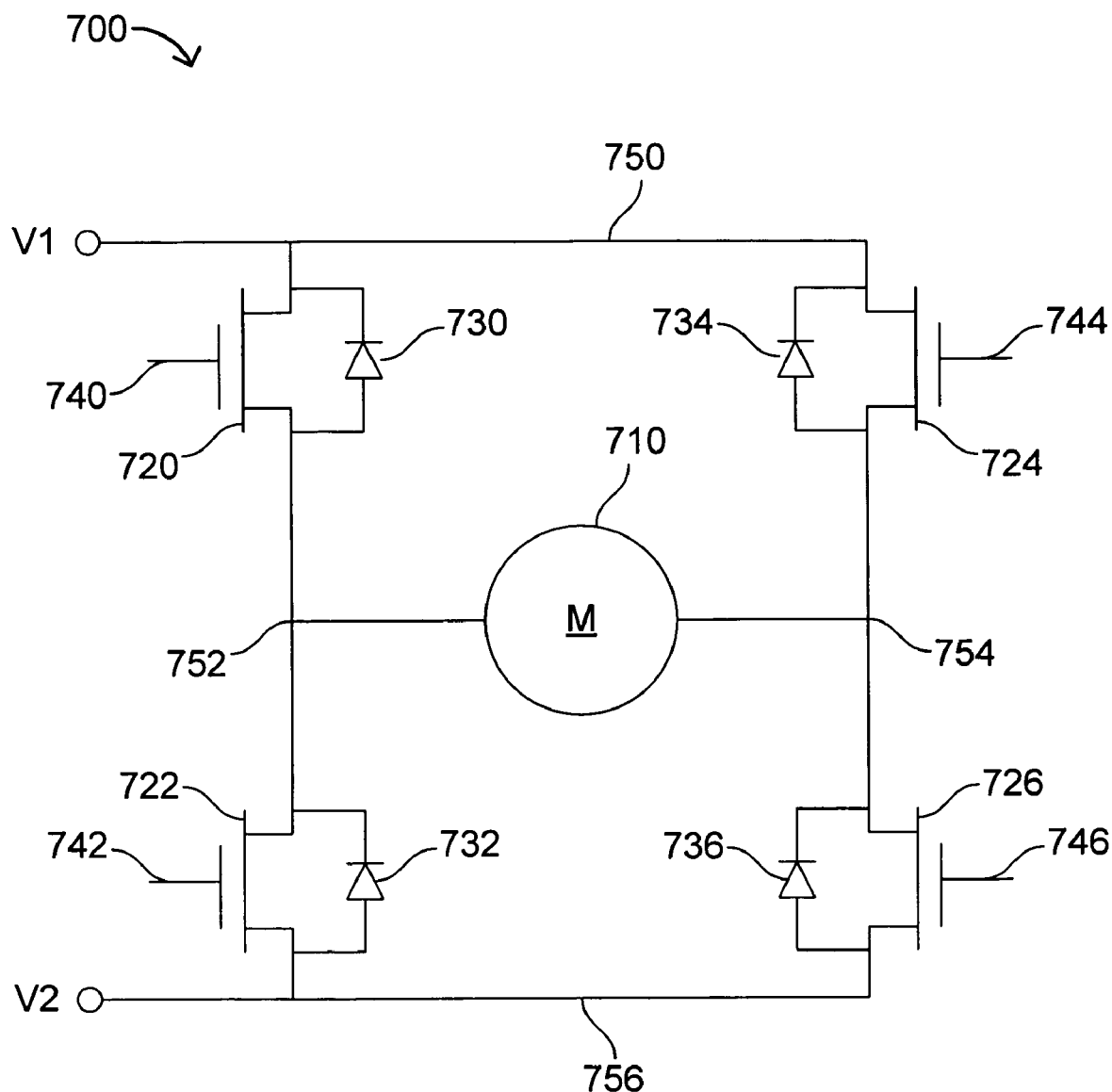
FIG. 7 is a diagram of a motor control circuit in accordance with some embodiments of the invention.

Referring to FIG. 7, showing a circuit diagram of an exemplary motor control circuit 700 that includes a DC motor 710 (e.g., similar to the DC motors 166, 366, and 566 described in previous embodiments). In this example, the motor control circuit 700 has an H-bridge circuit topology. The motor control circuit 700 includes switches 740, 742, 744, 746 which are connected to reverse protection diodes 730, 732, 734, 736, respectively.

The load current paths in the PWM circuits 610*a* are provided by the circuit connections as follows. The motor control circuit 700 is coupled to a source of power via a positive rail node 750 and a negative rail node 756. High side switches 720, 724 each have a terminal coupled to the positive rail node 750. Low side switches 722, 726 each have a terminal coupled to the negative rail node 756. High side switch 720 and low side switch 722 each have a terminal coupled to an output node 752 which is also connected to one terminal of the DC motor 710. High side switch 724 and low side switch 726 each have a terminal coupled to an output node 754, which is also connected to a second terminal of the DC motor 710.

The switches 720, 722, 724, 726 are individually connected to control signals 740, 742, 744, 746 as follows. Control signals 740, 742, 744, 746 are each coupled to a control input (for example, gate or base) of the switch 720, 722, 724, 726, respectively. For purposes of this disclosure, the control signals, 740, 742, 744, 746 may be in either a high state or a low state. In one state, the corresponding switch is typically operated in a non-conducting (off) state. In the other state, a corresponding switch is operated in a conducting (saturated on) state.

In one exemplary mode of operation, forward motion of the DC motor 710 may be accomplished as follows. The PWM sends control signals 740, 746 to turn on switches 720, 726. In this condition, the terminal of the DC motor 710 connected to output node 752 receives the high side voltage from positive rail node 750, and the terminal connected to output node 754 receives the low side voltage from negative rail node 756, and the motor rotates.

In another exemplary mode of operation, reverse motion of the DC motor 710 may be accomplished in a similar manner. The PWM sends control signals 742, 744 to turn on switches 722, 724. In this condition, the terminal of DC motor 710 connected to output node 754 receives the high side voltage from positive rail node 750, and the terminal connected to output node 752 receives the low side voltage from negative rail node 756, and the motor rotates in reverse.

The DC motor 710 may be decelerated from motion, or braked, in two exemplary modes. In the first exemplary mode, the PWM turns on switches 720, 724 while keeping switches 722, 726 turned off. This short circuits the DC motor 710 and causes it to act like a generator which causes the motor to decelerate or brake. In a second exemplary mode, the PWM can send control signals 742, 746 to close the switches 722, 726 which will also short circuit the DC motor 710 and it will decelerate or brake.

In an alternative embodiment, the switches 740, 742, 744, 746 may be implemented using other suitable switching devices, such as MOSFETs, JFETs, BJTs, IGBTs, or combinations of transistors, such as Darlington pairs, for example. The diodes 760, 762, 764, 766 may be discrete or directly integrated with the switches. Auxiliary circuitry (not shown) may be added to the motor control circuit 700 to provide, for example, gate drive, biasing, and protection as needed to operate the switches according to various embodiments.

In various embodiments, the PWM circuit 610*a* may be implemented using various circuit topologies. For example, the PWM circuit 610*a* may be any suitable dc—dc converter topology, including: full-bridge, half-bridge, buck, boost, buck-boost, Cuk, Cepic, flyback. The converter may have none or more stages, including power-factor corrected inputs or transformer-isolated inputs with appropriate rectification. The power source may be received from AC and or DC sources, including batteries.

Figure 8:
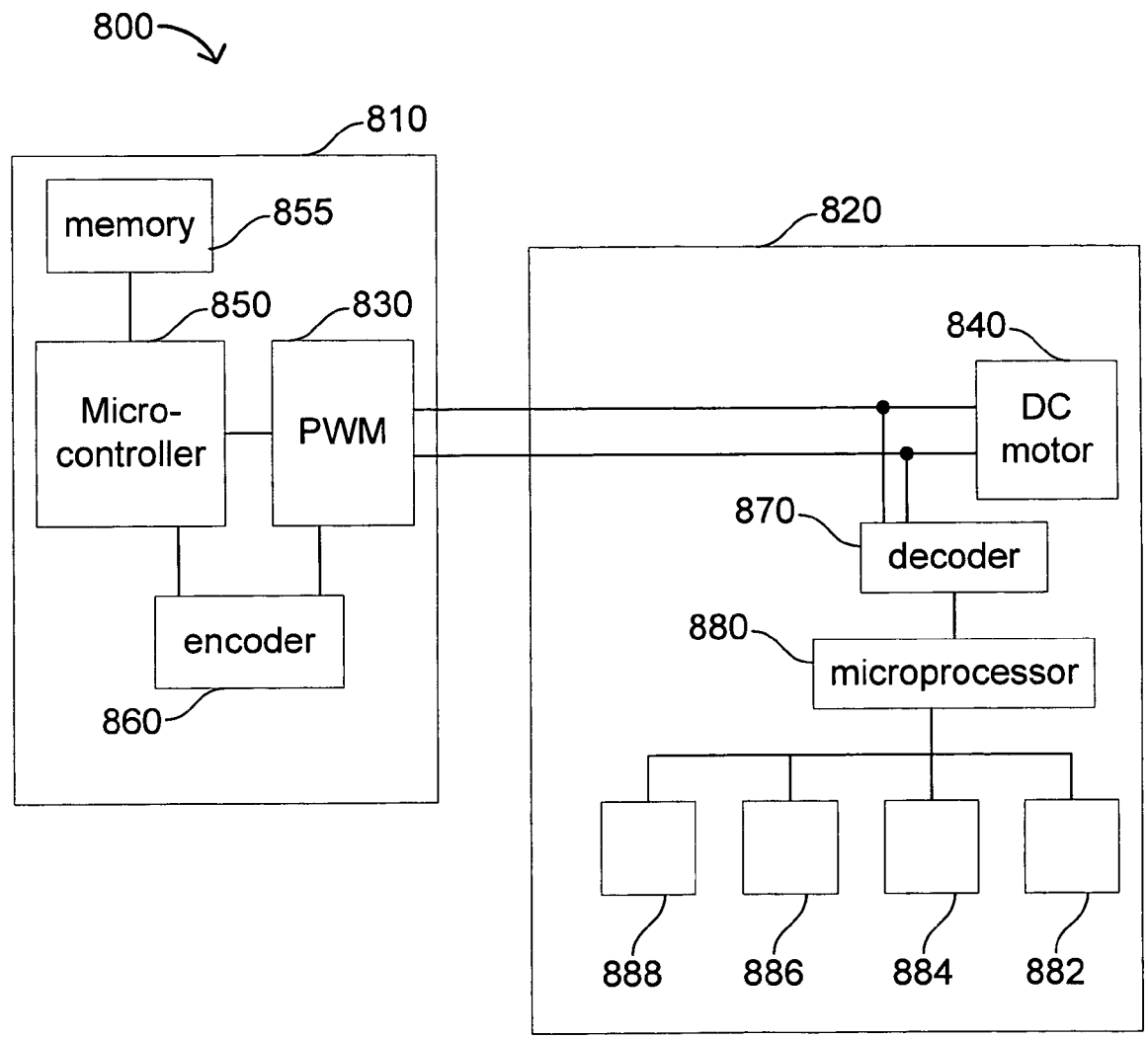
FIG. 8 is a block diagram of an embodiment of a controller.

Referring to FIG. 8, showing another embodiment of a controller 800. The controller 800 includes a microcontroller circuit 810 and an device circuit 820. The microcontroller circuit 810 includes such components as a PWM 830, a microcontroller 850, a memory 855, and an encoder 860. The decoration device circuit 820, which for example may contain the previously described train element 124 (refer to FIG. 1*a*, 3, or 5), includes such components as a DC motor 840, a decoder 870, a microprocessor 880, and it may include accessories such as LED's 882, lights 884, a whistle 886, and a smokestack 888.

In one implementation, the PWM 830 may be operated to power the DC motor 840. The microcontroller 850 can retrieve voltage profile information from the memory 855 and send the information to the PWM 830 which can generate the voltage waveforms to operate the DC motor.

In another implementation, the PWM 830 may be operated to communicate encoded information using the encoder 850 in addition to powering the DC motor 840. For example, the PWM 830 switching frequency may be alternately set to one of two selected frequencies, such as 110 kHz and 130 kHz, to encode information using, for example, a frequency-shift-keying (FSK) technique. Other similar encoding methods, such as amplitude-shift-keying (ASK) and phase-shift-keying (PSK), may be used to encode data at a fraction of the switching frequency while providing a controlled waveform to operate the DC motor 840.

The encoded information from the PWM 830 can be decoded by decoder 870 and sent to the microprocessor 880. In one implementation, the microprocessor 880 can use the decoded information to take a predetermined action, such as turning on or off a light, or operating a valve or relay. For the exemplary decoration device circuit 820, the microprocessor 880 can operate the LED's 882, lights 884, whistle 886, and the smokestack 880.

In other embodiments, two or more decoration devices (or a single decoration device having two or more spindle assemblies 370 with decorative elements thereon) may be operated in synchronism using controlled variations in the average voltage in the PWM waveform and/or information encoded in the modulation. The encoded information may include commands, data (e.g., audio, video), status, control, programming, or other information that may be used in the operating of the device, or system of devices having at least one DC motor.

Figure 9:
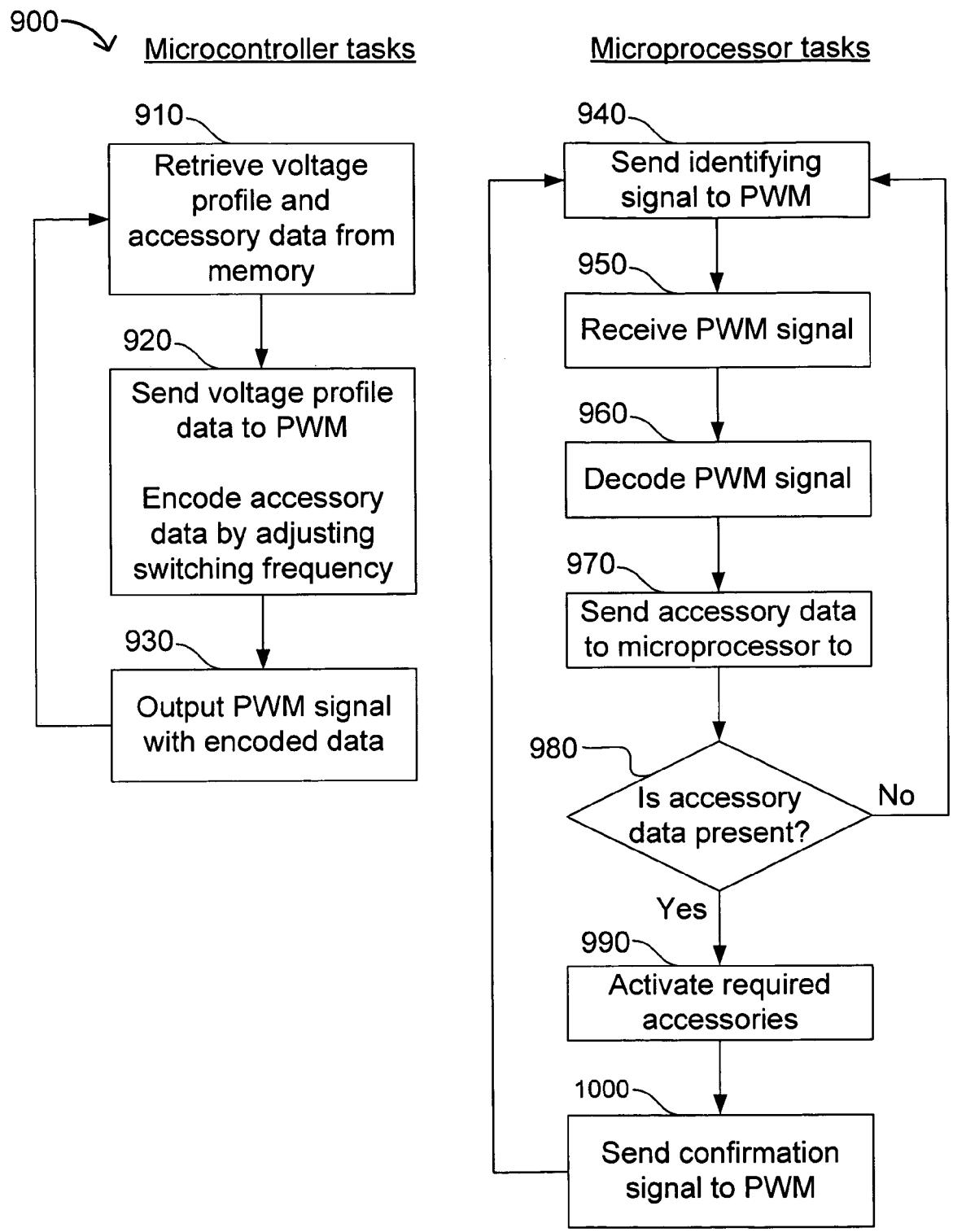
FIG. 9 is a flowchart of the operation of some components of a movable decoration device controller in accordance with some embodiments of the invention.

Referring to FIG. 9, showing a flowchart of the microcontroller 850 tasks and a flowchart of the microprocessor 880 tasks that represent the data transfer between the microcontroller circuit 810 and the decoration device circuit 820. In step 910, the microcontroller 850 retrieves the voltage profile and accessory operation data from the memory 855. At step 920, microcontroller 850 sends the voltage profile data to the PWM 830, and sends the accessory data to the encoder 860 to be encoded by adjusting the switching frequency or by a similar method. At step 930, the PWM 830 receives and modulates the data from the microcontroller 850 and the encoder 860 and outputs it to the decoration device circuit 820.

In step 940, the decoration device circuit 820 sends an identifying signal to the PWM 830 and receives the data in step 950. At step 960, the decoder 870 decodes the signal and sends the data to the microprocessor 880 in step 970. If the microprocessor 880 finds no accessory data present in step 980, an identifying signal is sent to the PWM 830 to restart the procedure. If the microprocessor 880 finds accessory data in step 980, it activates the required accessories in step 990, for example a previously described whistle or lights, and then sends a confirmation signal to PWM 830 in step 1000 and the process repeats.

In other embodiments, the decoration device may comprise a linear actuator that provides a substantially linear motion path for the movable ornament. The linear actuator may be substantially smaller and more durable than a DC motor. Also, the linear actuator may be generally more quiet than an AC or DC motor having a gear system coupled thereto. In one example, one or more PWM circuits may control the motion of a solenoid actuator to provide a substantially smooth, bidirectional linear motion for the movable ornament. In such circumstances, the linear actuator may directly engage (without a spindle assembly) or otherwise cause the movable ornament (e.g., the train element 124 or the like) to travel in a linear path between two or more stop locations (e.g., the train stations 108, 130, or 132 arranged along the linear path). Alternatively, the AC or DC motor may drive the linear motion of the movable ornament using a linkage apparatus to convert the rotary motion into linear motion and using, in some embodiments, a gear system that reduces the rotational speed from the motor.

As noted above, use of PWM controlled AC or DC motors may substantially reduce or eliminate the gearing needed to generate the necessary torque for a given ornament design. In certain embodiments, the gear system may comprise as few as four, three or two gears.

A number of embodiments of the invention have been described. Nevertheless, it will be understood that various modifications may be made without departing from the spirit and scope of the invention. Accordingly, other embodiments are within the scope of the following claims.

What is claimed is:

1. An ornament, comprising:
a base
a mobile decorative element that is movable relative to a base;
a motor having an output shaft coupled to the mobile decorative element such that rotation of the output shaft causes the mobile decorative element to move relative to the base;
a pulse width modulation controller to drive the motor; and
low friction interface means to support the decorative element relative to the base.

2. The ornament of claim 1, wherein the controller is programmed to drive the rotation of the output shaft according to a predetermined speed profile that varies with time.

3. The ornament of claim 1, wherein the low friction interface means comprises an interface between a first surface and a second surface characterized by a kinetic coefficient of friction of less than about 0.3.

4. The ornament of claim 3, wherein the kinetic coefficient of friction is about 0.03 to about 0.2.

5. The ornament of claim 1, wherein the low friction interface means comprises a slidable engagement between a first surface and a second surface, the first and second surfaces comprises one or more polymer material.

6. The ornament of claim 1, wherein the mobile decorative element has a first surface that is at least partially supported by an opposing second surface of the base.

7. The ornament of claim 6, wherein the first surface and the opposing second surface have a low friction interface to limit the friction load on the motor, the low friction interface being characterized by a kinetic coefficient of friction between the first and second surfaces of less than about 0.2.

8. The device of claim 1, wherein the decorative element is releasably coupled to the output shaft by a spline assembly so that rotational motion of the output shaft is translated to the mobile decorative element and so that the mobile decorative element is removable from the output shaft in an axial direction.

9. The device of claim 5, further comprising a second mobile decorative element having a different appearance than the first mobile decorative element, the second having at least a portion of the spline assembly to releasably couple the second mobile decorative element to the output shaft such that the second mobile decorative element is interchangeable with the first mobile decorative element.

10. The device of claim 1, wherein the output shaft of the motor is coupled to the mobile decorative element via a gear system that causes the mobile decorative element to rotate at a rate less than the rotation of the output shaft.

11. The device of claim 10, wherein the gear system comprises four or fewer gears.

12. The device of claim 10, wherein the gear system comprises three or fewer gears.

13. The device of claim 10, wherein the gear system comprises two or fewer gears.

14. The device of claims 1, 2, 3, or 12, wherein the motor comprises a DC motor.

15. The device of claim 1, wherein the mobile decorative element is mounted to a spindle assembly that is mechanically coupled to the output shaft of the motor.

16. The device of claim 1, wherein the pulse width modulation controller outputs a pulse-width-modulated waveform having a duty cycle that is controllably adjusted to obtain a corresponding adjustment to the rotational speed of the output shaft of the motor.

17. An ornament, comprising:
a base
a mobile decorative element that is movable relative to a base;
a motor having an output shaft coupled to the mobile decorative element such that rotation of the output shaft causes the mobile decorative element to move relative to the base;
a pulse width modulation controller to drive the motor; and
low friction interface means to support the decorative element relative to the base, wherein the interface means comprises one or more roller assemblies, each roller assembly having a surface that engages an opposing surface coupled to the base.

18. The ornament of claim 17, wherein the controller is programmed to drive the rotation of the output shaft according to a predetermined speed profile that varies with time.

19. The device of claim 17, wherein the output shaft of the motor is coupled to the mobile decorative element via a gear system that causes the mobile decorative element to rotate at a rate less than the rotation of the output shaft.

20. The device of claims 19, wherein the motor comprises a DC motor.

21. An ornament, comprising:
a base
a mobile decorative element mounted on a spindle assembly that is movable relative to a base;
a motor having an output shaft mechanically coupled to the spindle assembly such that rotation of the output shaft causes the mobile decorative element to move relative to the base;
a pulse width modulation controller to drive the motor, the pulse width modulation controller outputs a pulse-width-modulated waveform that is output to the motor; and
low friction interface means for supporting the decorative element relative to the base.

22. The ornament of claim 21, wherein the pulse width modulation controller is programmed to drive the rotation of the output shaft according to a predetermined speed profile that varies with time.

23. The ornament of claim 22, wherein the predetermined speed profile that varies with time comprises an acceleration over a predetermined period of time, a generally constant rotation over a predetermined period of time, and deceleration over a predetermined period of time.

24. The ornament of claim 21, wherein the mobile decorative element has a first surface that is at least partially supported by an opposing second surface of the base.

25. The ornament of claim 24, wherein the low friction interface means comprises an interface between the first surface and the second surface characterized by a kinetic coefficient of friction of less than about 0.3.

26. The ornament of claim 24, wherein the kinetic coefficient of friction is about 0.03 to about 0.2.

27. The ornament of claim 24, wherein the low friction interface means comprises a slidable engagement between the first surface and the second surfaces, the first and second surfaces comprises one or more polymer materials.

28. The ornament of claim 27, wherein the first surface and the opposing second surface have a low friction interface to limit the friction load on the motor, the low friction interface being characterized by a kinetic coefficient of friction between the first and second surfaces of less than about 0.2.

29. The device of claim 21, wherein the output shaft of the motor is mechanically coupled to the spindle assembly via a gear system that causes the mobile decorative element to rotate at a rate less than the rotation of the output shaft.

* * * * *